Mar. 20, 1923.

R. E. CLISBY 1,448,727

COMBINATION BAIL EAR AND HANDLE

Filed Jan. 6, 1922

INVENTOR.
Roy E. Clisby
BY
Fay, Oberlin + Fay
ATTORNEYS

Patented Mar. 20, 1923.

1,448,727.

UNITED STATES PATENT OFFICE.

ROY E. CLISBY, OF WELLINGTON, OHIO, ASSIGNOR TO THE STERLING MACHINE & STAMPING COMPANY, OF WELLINGTON, OHIO, A CORPORATION OF OHIO.

COMBINATION BAIL EAR AND HANDLE.

Application filed January 6, 1922. Serial No. 527,378.

*To all whom it may concern:*

Be it known that I, ROY E. CLISBY, a citizen of the United States, and a resident of Wellington, county of Lorain, and State of Ohio, have invented a new and useful Improvement in Combination Bail Ears and Handles, of which the following is a specification, the principle of the invention being herein explained and the best mode in which I have contemplated applying that principle, so as to distinguish it from other inventions.

The present invention relates particularly to a combined bail ear and handle suitable for use on culinary utensils, such as kettles, boilers, and the like, one principal object being to provide a unitary member capable of serving both the purposes indicated. In addition, the construction of the bail ear and of the end of the bail that engages therewith is such that the bail may be readily detached from the ear, and when in place therein may be left standing in vertical position, the handle element being so formed and disposed as to retain such bail in horizontal position.

To the accomplishment of the foregoing and related ends, said invention, then, consists of the means hereinafter fully described and particularly pointed out in the claim; the annexed drawing and the following description setting forth in detail certain mechanism embodying the invention, such disclosed means constituting, however, but one of various mechanical forms in which the principle of the invention may be used.

In said annexed drawing:—

Figure 1:
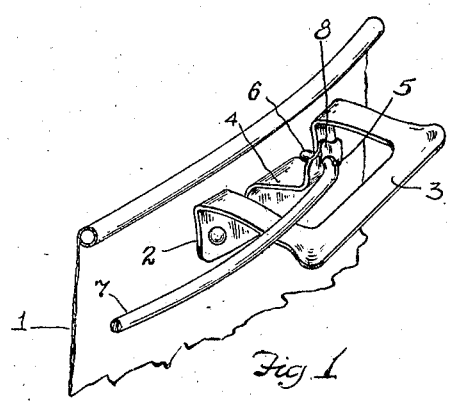
Figure 2:
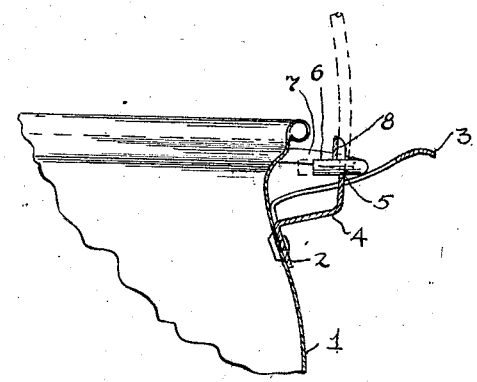

Fig. 1 is a perspective view of a vessel fitted with my improved combination handle and bail ear; and Fig. 2 is a transverse section through the same.

Only a broken section of the vessel 1 appears in the several figures of the drawing, and there is shown only one of the two combination handles and bail ears, with which such vessel is equipped. The device in question comprises a base portion 2 that is riveted or otherwise fixedly secured to the side walls of the vessel 1, conforming therewith in its general shape. The handle portion 3 is bent outwardly at approximately right angles to such base, and is of open rectangular form as best shown in Fig. 1. The bail ear 4 is likewise bent outwardly at approximately right angles to the base, but on a lower plane than that of the handle 3, and is then bent upwardly, lying wholly within the open portion of the handle. The upturned portion of the bail ear is provided with an aperture 5 adapted to receive the inwardly bent ends 6 of the bail 7, and directly above such aperture the ear is crimped to provide a vertical recess 8, into which the side portion of the bail 7 is adapted to fit when such bail stands vertically.

It will be understood that the bail is of general semi-circular form and that it is bent so that its respective side portions tend to press inwardly when the ends 6 thereof are inserted in the respective ears. Accordingly, when the handle is brought to a vertical position the side portions in question spring into the recesses 8 of the bail ears and will there remain, holding the bail vertical until, and unless, it is pushed over to one side or the other. It will be further observed that the side portions of the handle 3 lie in approximately the plane of the openings 5 in the respective bail ears, so that when the handle is lowered from its vertical position just described it will not drop down against the side of the vessel 1, but will be retained in a horizontal position by engagement with one such side portion or the other of the respective handle members 3.

Aside from the advantageous operative features just described, it will be seen that my improved device is capable of being stamped up integrally from a sheet of metal, the bail ear being fashioned out of the metal lying within the handle portion 3 with only a small amount of waste material. Moreover, the external outline of the device, as struck from the flat sheet of metal, is very nearly rectangular so that there will be little waste of material between successive stampings.

Other modes of applying the principle of my invention may be employed instead of the one explained, change being made as regards the mechanism herein disclosed, provided the means stated by the following claim or the equivalent of such stated means be employed.

I therefore particularly point out and distinctly claim as my invention:—

The combination of a bail ear and handle, formed from a substantially rectangular piece of sheet metal, comprising a base portion adapted to be attached to the side of a vessel, a handle portion of open rectangular form bent outwardly with respect to said base, a bail ear bent outwardly and then upwardly with respect to said base and lying within said handle portion, said ear being provided adjacent its upper end with an aperture for the reception of the end of the bail, and an indented portion formed in said ear above said aperture providing a vertical depression for engagement with the end of the bail when said bail is in vertical position.

Signed by me this 3 day of January, 1922.

ROY E. CLISBY.